(12) United States Patent
Dufresne et al.

(10) Patent No.: US 10,390,504 B2
(45) Date of Patent: Aug. 27, 2019

(54) MULTILEVEL MOBILE GUTTER SYSTEM FOR GROWING INDOOR VEGETATION

(71) Applicants: Stephen A. Dufresne, Calgary (CA); Isaac Van Geest, Bergschenhoek (NL)

(72) Inventors: Stephen A. Dufresne, Calgary (CA); Isaac Van Geest, Bergschenhoek (NL)

(*) Notice: Subject to any disclaimer, the term of this patent is extended or adjusted under 35 U.S.C. 154(b) by 187 days.

(21) Appl. No.: 15/205,738

(22) Filed: Jul. 8, 2016

(65) Prior Publication Data
US 2018/0007850 A1    Jan. 11, 2018

(51) Int. Cl.
| | |
|---|---|
| *A01G 31/06* | (2006.01) |
| *B65G 1/04* | (2006.01) |
| *B65G 1/02* | (2006.01) |
| *A01G 31/04* | (2006.01) |
| *A01G 9/04* | (2006.01) |
| *B65G 19/26* | (2006.01) |
| *B65G 1/133* | (2006.01) |

(52) U.S. Cl.
CPC ............ *A01G 31/06* (2013.01); *A01G 9/047* (2013.01); *A01G 31/042* (2013.01); *B65G 1/026* (2013.01); *B65G 1/0407* (2013.01); *B65G 19/265* (2013.01); *B65G 1/045* (2013.01); *B65G 1/133* (2013.01); *B65G 2201/0211* (2013.01); *B65G 2203/0216* (2013.01); *Y02P 60/216* (2015.11)

(58) Field of Classification Search
CPC .... A01G 31/04; A01G 31/042; A01G 31/045; A01G 31/06; B65G 1/0407; B65G 1/1371; B65G 19/02; B65G 2203/0216; B65G 1/026; B65G 1/0478; B65G 1/12; B65G 1/133; B65G 47/71

USPC ............... 47/62 E; 198/347.1, 435, 456, 603
See application file for complete search history.

(56) References Cited

U.S. PATENT DOCUMENTS

| | | | | |
|---|---|---|---|---|
| 2,647,647 A | * | 8/1953 | Mihai | E04H 6/186 414/254 |
| 2,918,020 A | * | 12/1959 | Henderson | B65G 23/14 104/172.5 |
| 3,118,549 A | * | 1/1964 | Hoellen | B65G 1/1371 198/347.4 |
| 3,254,447 A | * | 6/1966 | Othmar | A01G 9/14 47/65 |
| 3,276,163 A | * | 10/1966 | Oepen | A01G 31/042 47/65 |
| 5,303,505 A | * | 4/1994 | Sumiyoshi | A01G 9/143 47/65 |

(Continued)

*Primary Examiner* — Joshua D Huson
*Assistant Examiner* — Brady W Frazier
(74) *Attorney, Agent, or Firm* — Dunlap Bennett & Ludwig PLLC (57) ABSTRACT

A multilevel indoor mobile gutter system for growing vegetation including at least a first level and a second level is provided. Each level may include a first level conveyor and a second level conveyor respectively. A transfer conveyor is operable to convey from the first level to the second level. A plurality of lights are positioned to emit light towards the first level and the second level. At least one gutter is operable to support a plant within. The first level conveyor transports the at least one gutter from the front end to the rear end of the first level, the transfer conveyor transfers the at least one gutter from rear end of the first level to the front end of the second level, and the second level conveyor transports the at least one gutter from the front end to the rear end of the second level.

16 Claims, 10 Drawing Sheets

(56) References Cited

U.S. PATENT DOCUMENTS

| | | | | |
|---|---|---|---|---|
| 6,681,916 B2* | 1/2004 | Hiroki | ............. | B65G 35/06 198/347.1 |
| 9,688,479 B1* | 6/2017 | Gorski | ............. | B65G 47/71 |
| 2004/0163308 A1* | 8/2004 | Uchiyama | ............. | A01G 7/045 47/1.01 R |
| 2005/0268547 A1* | 12/2005 | Uchiyama | ............. | A01G 7/045 47/64 |
| 2006/0201058 A1* | 9/2006 | Ripatti | ............. | A01G 31/042 47/1.1 |
| 2010/0269407 A1* | 10/2010 | Prohaska | ............. | A01G 9/00 47/65 |
| 2012/0060416 A1* | 3/2012 | Brusatore | ............. | A01G 31/06 47/62 A |
| 2012/0118699 A1* | 5/2012 | Buchmann | ............. | B65G 47/5145 198/347.1 |
| 2012/0279122 A1* | 11/2012 | Benne | ............. | A01G 31/045 47/60 |
| 2012/0324788 A1* | 12/2012 | Sakura | ............. | A01G 9/083 47/66.6 |
| 2013/0305601 A1* | 11/2013 | Park | ............. | A01G 31/04 47/17 |
| 2014/0017043 A1* | 1/2014 | Hirai | ............. | A01G 31/02 414/267 |
| 2014/0023462 A1* | 1/2014 | Lalesse | ............. | B65G 1/0407 414/277 |
| 2014/0056672 A1* | 2/2014 | Mathys | ............. | B65G 1/0407 414/277 |
| 2014/0346008 A1* | 11/2014 | Hoynash | ............. | B65G 1/04 198/347.1 |
| 2015/0282437 A1* | 10/2015 | Ohara | ............. | A01G 7/00 47/66.6 |
| 2016/0014977 A1* | 1/2016 | Esaki | ............. | A01G 31/06 47/66.6 |
| 2016/0302369 A1* | 10/2016 | Pickell | ............. | A01G 31/045 |
| 2017/0027112 A1* | 2/2017 | Vail | ............. | A01G 31/06 |
| 2017/0127629 A1* | 5/2017 | Miyabe | ............. | A01G 31/06 |
| 2018/0035624 A1* | 2/2018 | Itoh | ............. | A01G 9/0299 |

* cited by examiner

MULTILEVEL MOBILE GUTTER SYSTEM FOR GROWING INDOOR VEGETATION

BACKGROUND OF THE INVENTION

The present invention relates to indoor growing systems and, more particularly, to a multilevel mobile closed loop gutter growing system for growing high density vegetation in a controlled indoor environment.

A grow room is a room of any size where plants are grown under controlled environmental conditions. Plants are grown with the use of artificial light. The plants in a grow room can be grown in soil, or without soil via means of hydroponics technology. Utilizing a warehouse as a grow room either next to or in dense population areas is very desirable in order to provide fresh quality vegetation with higher levels of nutrition while substantially reducing your carbon foot print.

As can be seen, there is a need for improved and efficient systems for growing vegetation within indoor grow rooms.

SUMMARY OF THE INVENTION

In one aspect of the present invention, a multilevel closed loop system for growing vegetation comprises: a first level comprising a front end, a rear end, a first side and a second side, and a first level conveyor; a second level comprising a front end, a rear end, a first side and a second side, and a second level conveyor; a transfer conveyor; a plurality of lights positioned to emit light towards the first level and the second level; and at least one gutter operable to support a plant within, wherein the first level conveyor transports the at least one gutter from the front end to the rear end of the first level, the transfer conveyor transfers the at least one gutter from the rear end of the first level to the front end of the second level, and the second level conveyor transports the at least one gutter from the front end to the rear end of the second level.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a multilevel closed loop gutter growing system having a Hydroponic Ebb & Flow (E&F) watering system, rectangular gutters, and a multilevel rack structure (tower) for the production of high density fresh vegetation grown in a controlled indoor environment. The multilevel mobile gutter growing system supports plants in a gutter allowing (E&F) to irrigate the roots in a confined growth chamber supported on a horizontal tower. Further the present invention facilitates the planting, harvesting and servicing of vegetation from one end of the growing room and without the need for ladders, stairs.

The present invention is extremely useful in that it utilizes a standard warehouse located anywhere such as next to the local urban population it is servicing i.e. in the cities. The present invention converts warehouses into a large environmentally controlled growth chamber that can house multiple multilevel towers with multiple mobile growing gutters. The multilevel tower of the present invention each have a plurality of growing gutters that are capable of producing large volumes of vegetation in a small space and facilitating the local delivery of fresh vine ripped nutritious vegetation with a very small carbon foot print.

In addition to the above mentioned benefits, the present invention provides for maximum Leaf Area Index (LAI) while providing for maximum number of plants per square foot per level. The present invention creates a closed cavern allowing the plant to flourish on the outside of a gutter environment with light and enriched CO2 air for the photosynthesis process. The present invention creates a dark environment inside the gutters for the roots to absorb the nutrient fertilizer while being protected from light and the enriched CO2 air which can be harmful to the roots. The growing gutters have been specifically calculated to occupy the minimum amount of floor square footage while still allowing plants to grow without touching or overlapping the and acquiring the maximum LAI to reach their full potential size.

Referring to FIGS. 1 through 10, the present invention includes a multilevel closed loop system for growing vegetation. The multilevel system may include at least a first level 26 and a second level 26. Each level 26 may include a front end, a rear end, a first side and a second side. Each level 26 may further include a first level conveyor 12, 13 and a second level conveyor 12, 13 respectively. The present invention may further include a transfer conveyor 7 operable to convey from the first level 26 to the second level 26. A plurality of lights 6 are positioned to emit light towards the first level 26 and the second level 26. The present invention further includes at least one gutter 5 operable to support a plant within. The first level conveyor 12, 13 transports at least one gutter 5 from the front end to the rear end of the first level 26, the transfer conveyor 7 transfers the at least one gutter 5 from rear end of the first level 26 to the front end of the second level 26 and the second level conveyor 12, 13 transports the at least one gutter 5 from the front end to the rear end of the second level 26.

In certain embodiments, the first level 26 and the second level 26 are disposed side by side one another. The front end of the first level 26 may be adjacent to the rear end of the second level 26 and the rear end of the first level 26 may be adjacent to the front end of the second level 26. In such embodiments, the transfer conveyor 7 may include a transfer conveyor belt 7a that runs from the rear end of the first level 26 to the front end of the second level 26. Therefore, the gutter 5 may travel from the front end to the rear end of the first level 26 and onto the conveyor belt 7a. The conveyor belt 7a transfers the gutter 5 to the front end of the second level 26 and the second level conveyor 12, 13 transports the gutter 5 from the front end to the rear end, and thereby back to an area adjacent to the front end of the first level 26.

In certain embodiments, the first level 26 and the second level 26 are disposed above and below one another. The front end of the first level 26 may be adjacent to the rear end of the second level 26 and the rear end of the first level 26 may be adjacent to the front end of the second level 26. In such embodiments, the transfer conveyor 7 may include a lift 7b that is disposed at the rear end of the first level 26 and the front end of the second level 26. Therefore, the gutter 5 may be transported by conveyor 12, 13 from the front end to the rear end of the first level 26 and onto the lift 7b. The lift 7b may lift or lower the gutter 5 to the front end of the second level 26 and the second level conveyor 12, 13 transports the gutter 5 from the front end to the rear end, and thereby back to an area adjacent to the front end of the first level 26.

The multilevel system of the present invention may be in the form of a plurality of towers 1. A plurality of levels 26 may be disposed horizontally and parallel to one another on each of the towers 1. Each tower 1 may include at least four posts 9, two trellises 10, and two cross support beams 11. The lights 6 may be hung under the trellis 10 to illuminate the plants on the level 26 below. The post 9 height may vary from about 6 feet to about 32 feet. The trellis 10 depth may vary from about 1 foot up to about 4 feet, depending on the weight of the number of gutters 5. The length of the trellis 10 may vary from about 4 feet to about 30 feet depending on the support weight of the trellis 10 in proportion to the number of weight of the gutters 5 in use. The distance between each post 9 may vary from about 6 feet up to about 12 feet. The cross support beams 11 depends on the width distance between each post 9. The width distance of the posts 9 is determined by the length of the trellis 10. The number of levels 26 in a tower 1 may vary from two to twenty depending on the level spacing 27 between levels 26 and the height to the warehouse trellises. The number of levels 26 may vary the number of total gutters 5 used in the tower 1.

The plurality of towers 1 may include at least a first tower 2 and a second tower 3 disposed side by side. Each of the first tower 2 and the second tower 3 may include parallel first levels 26 and second levels 26 disposed above and/or below one another. In such embodiments, the transport conveyor 7 may include a plurality of transfer conveyor belts 7a and at least one lift 7b. The lift 7b is disposed at a rear end 4b of the plurality of towers 1 and includes a vertical track 24 and a horizontal track 25. The horizontal track 25 may be mounted on the floor or recessed in a pit that may be at least about 8 ft wide and about 1 ft deep and run the whole distance of the width of the two towers 1. The lift 7b may move from one tower to the next via the horizontal track 25. The lift 7b may move up and down from one level to the next via the vertical track 24. The lift 7b transports the gutters 5 from one of the first levels 26 to one of the second levels 26. The plurality of conveyor belts 7a may be disposed at a front end 4a of the plurality of towers 1. Each of the transfer conveyor belts 7a may be disposed at different levels 26 of the towers 1 and each of the transfer conveyor belts 7a transfers the gutters 5 from one of the second levels 26 of the first tower 2 to one of the second levels 26 of the second tower 3 and/or vice versa. Thus with two or more towers 1, a plurality of transfer conveyor belts 7a and a lift 7b create a closed loop growing cycle for each gutter 5.

In certain embodiments, the first tower 2 and second tower 3 may each include a main level 28. The main level 28 may be about waist high and may not include a conveyor belt 7a. The first tower 2 may include a harvesting platform 43 and the second tower 2 may include a planting platform 44 disposed at the main level 28. The plants begin their growing journey on the main level 28 planting platform 44. The gutters 5 are filled with vegetation plugs and then the gutters 5 are manually pushed onto the second tower 3 to begin traveling to the back of the second tower 3. Once the gutter 5 has reached the rear end of the tower 3, push arms 8 push the gutters 5 onto the lift 7b. The lift 7b transfers the gutters 5 up to a different level 26 on the first tower 2. The lift 7b delivers the gutter 5 to the different level 26 via push arms 8 and the gutter 5 travels from the front end of the different level 26 to the rear end of the different level 26. The plant within the gutter 5 grows while traveling through the levels 26. Once the gutter 5 reaches the front of the first tower 2, the gutter 5 is pushed on to the transfer conveyor belt 7a by push arms 8. The gutter 5 then travels over to the second tower 3 to be pushed by additional push arms 8 on the transfer conveyor 7a onto a level 26 of the second tower 3. The gutter 5 continues to cycle through the second tower 3 and the first tower 2 until the gutter plants reach maturity at which time the gutters 5 is sent to the main level 28 of the first tower 2 for its final journey to the harvesting platform 43 in which the plants are harvested. In certain embodiments, whatever the number of gutters 5 that are harvested from the main level 28 off the first tower 2, there will be the same number of gutters 5 re-planted on the planting platform 44 each day on the second tower 3 to begin the growing journey all over again. As illustrated above, FIG. 10 the present invention is a closed loop continuous revolving growing system.

In certain embodiments, the present invention may include a multi level 26 single tower 1 having more than two levels 26. In such embodiments, the present invention may include two lifts 7b producing the closed loop continuous revolving growing system. The gutter 5 moves back and forth from the front of the tower 4a to the rear of the tower 4b and the lifts 7b transfers the gutters 5 to different levels 26 within the tower 1 in the front and the rear.

Figures 7A, 7B:
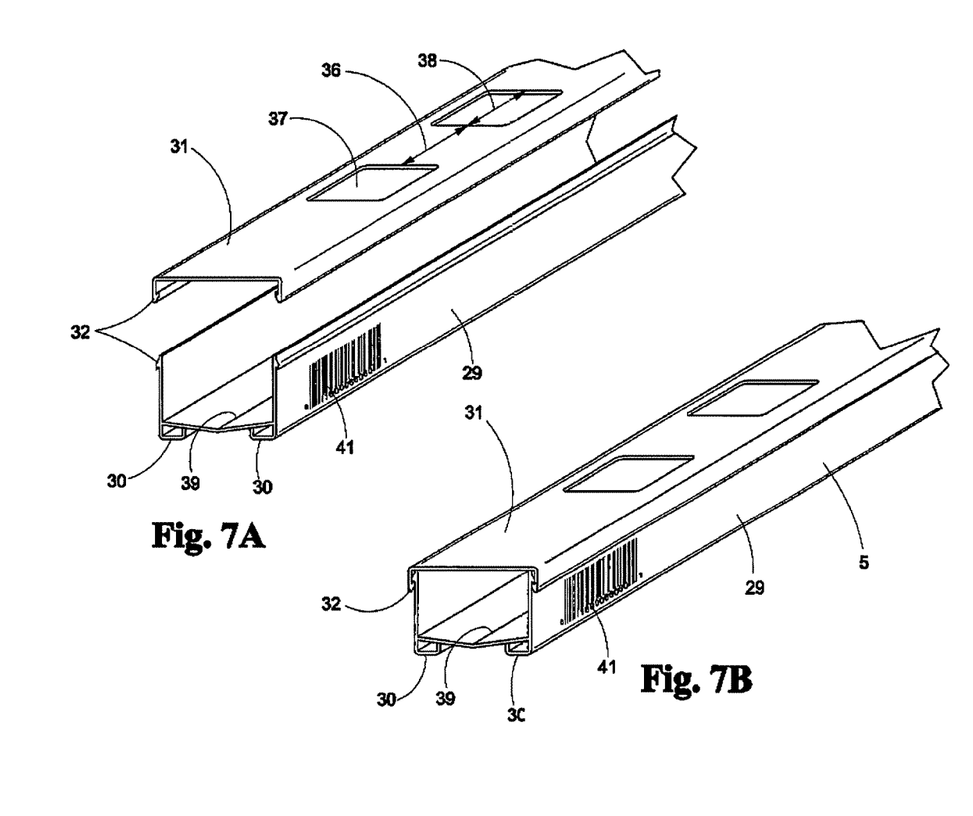
FIG. 7A is an exploded view of a gutter of an embodiment of the present invention illustrating a removable cover.
FIG. 7B is a perspective view of a gutter of an embodiment of the present invention.
Figures 8A, 8B:
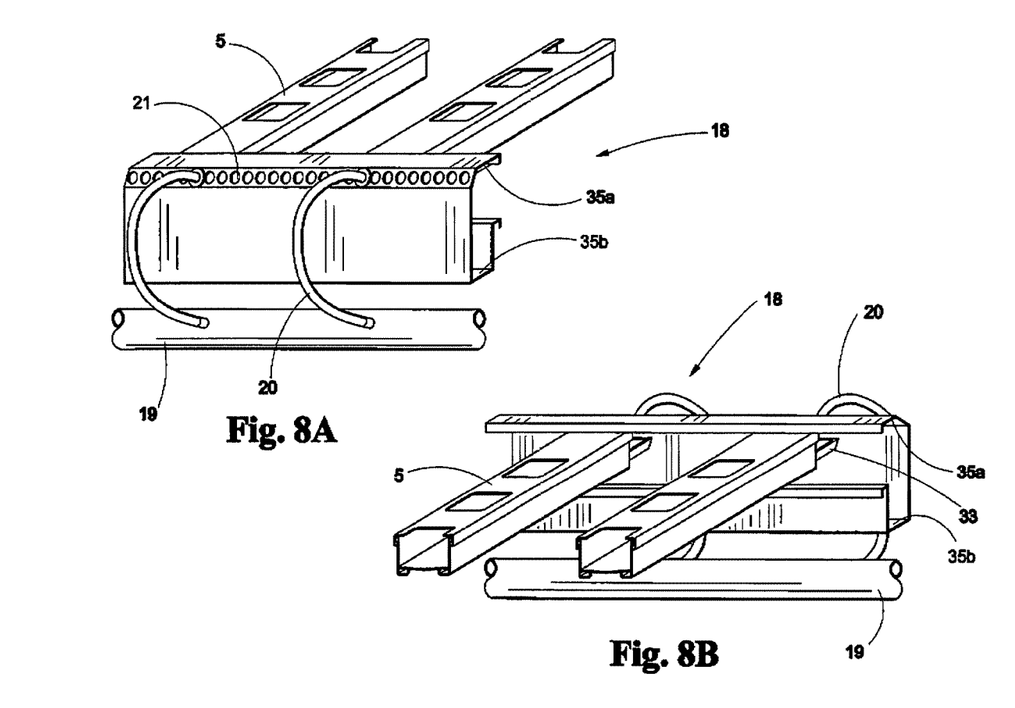
FIG. 8A is a detail perspective view illustrating a water delivery system of an embodiment of the present invention.
FIG. 8B is a detail perspective view illustrating a water delivery system of an embodiment of the present invention.
Figures 9A, 9B:
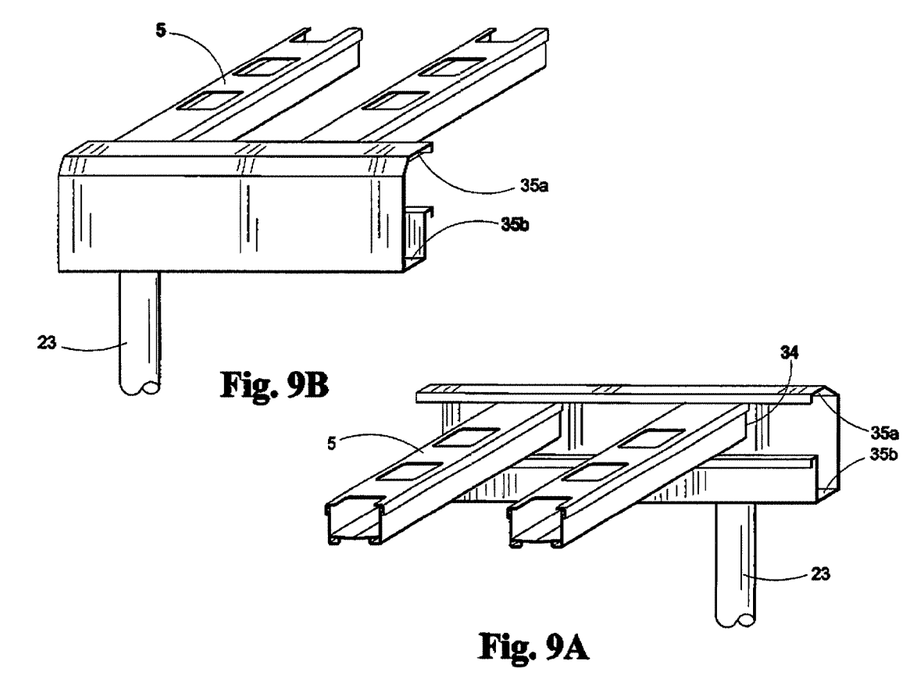
FIG. 9A is a detail perspective view illustrating a water recovery system of an embodiment of the present invention.
FIG. 9B is a detail perspective view illustrating a water recovery system of an embodiment of the present invention.
Figure 10:
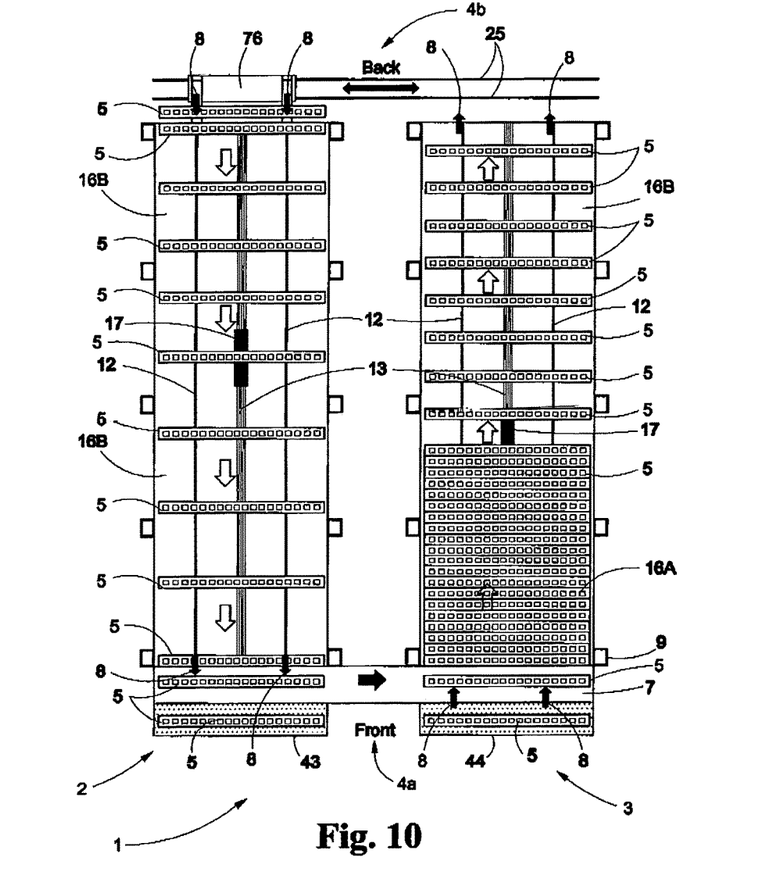
FIG. 10 is the top view of a level of each of the towers of the racking structure of FIG. 1.

The present invention may utilize a plurality of gutters 5 running through the multilevel system. The gutter 5 may be made of a polymer such as, but not limited to, thermoform, prime Acrylonitrile-Butadiene-Styrene (ABS), high molecular weight polyethylene, Amorphous thermoplastic material, and the like Each of the gutters 5 may include an elongated base 29 and an elongated cover 31. The elongated base 29 may include a bottom and sidewalls extending vertically from the bottom. The elongated base 29 may be from about 3 inches up to about 5 inches wide and from about 1.5 inches to 2.8 inches high. The elongated cover 31 attaches to the sidewalls forming an enclosure in between the elongated base 29 and the elongated cover 31. The elongated cover 31 may include a plurality of plant plug holes 37 sized to receive and retain a plant within. In certain embodiments, the elongated base 29 may include a first side having a catch pan 33 and a second side having an open end 34 that drains into a drain trough 35*b*. The gutters 5 may each include a foot 30 or feet 30 protruding from the bottom end. For example, the feet 30 may protrude from the outer edges of the bottom end along the length of the gutters 5.

The elongated cover 31 may be releasably attached to the elongated base 29. In such embodiments, the elongated base 29 includes two extruding gutter snaps 32 one on each side of the outer edge at the top of the sidewalls. The elongated cover 31 may further include two inverted gutter snaps 32, one on each of the insides of the lower edges of the elongated cover 31. Therefore, the elongated cover 31 may slide down over the snaps 32 of the elongated base 29 and lock the elongated cover 31 to the elongated base 29 which now forms a complete gutter 5. The snaps 32 allow the elongated cover 31 to be secured to the elongated base 29 to be easily removable to change to a different plant plug hole size 38 using the same elongated base 29 and for easy access to the elongated base 29 for cleaning. In certain embodiments, the elongated base 29 includes slope towards a longitudinal center 39 to help direct the water down to the middle of the elongated base 29 to ensure that the roots are properly watered. The elongated cover 31 may have gutter hole spacing 36 from about 0.039 to about 12.80 inches depending on the plant's LAI requirements. The plant plug size 38 may vary from about 1 to about 4 inches and may be in the shape of a square, rectangle, oval or circle depending on the plug of the plant.

In certain embodiments, the multilevel system includes a watering system 18. Each of the first level 26 and the second level 26 may include the watering system 18 operable to deliver water to the gutters 5. The watering system 18 may include a plurality of hoses 20 connected to a water line 19. The plurality of hoses 20 are disposed on the first side of the levels 26 and are positioned to deliver water to the catch pan 33 of the gutter 5. The watering system 18 may further include a return pipe 23 disposed on the second side of the levels 26. The return pipe 23 is positioned to receive water from the drain trough 35*b* and transport the water back to a water reservoir. In order for the water to flow through the gutters 5, the trellises 10 in the towers 1 may be assembled on a slope. The degree of the slope may be dependent on the length of the gutters 5.

The watering system 18 may further include support brackets 35. A first support bracket 35 is secured to the first side of each of the levels 26 and includes a plurality of openings 21. Each of the plurality of hoses 20 runs from the water line 19 to one of the openings 21 of the first support bracket 35. A second support bracket 35 may be attached to the second side of each of the levels 26. The second support bracket 35 may include the drain trough 35*b* that directs water from the opening 34 of the gutter 5 to the return pipe 23. The support brackets 35 may further include a shade hood 35*a*, preventing evaporation of water entering and leaving the gutters 5 and minimizing the growth of algae.

As mentioned above, the first and second level conveyors 12, 13 transport the gutters 5 from the first end to the second end of the levels 26 respectively. The first and second level conveyors 12, 13 may each include at least one transport track 13. The transport track 13 includes an upper channel running from a front end to a rear end. A chain 15 runs within the transport track 13. A plurality of clackers 16 may be secured to the chain 15 so that at least a tip of each of the clackers 16 protrudes beyond the upper channel of the transport track 13. An actuator 14 may be used to move the chain 15 back and forth in the transport track 13. The actuator 14 drives the chain 15 and the clackers 16 catch the foot 30 or feet 30 of each of the plurality of gutters 5, thereby pushing the plurality of gutters 5 from the front end to the rear end of the levels 26.

Figure 1:
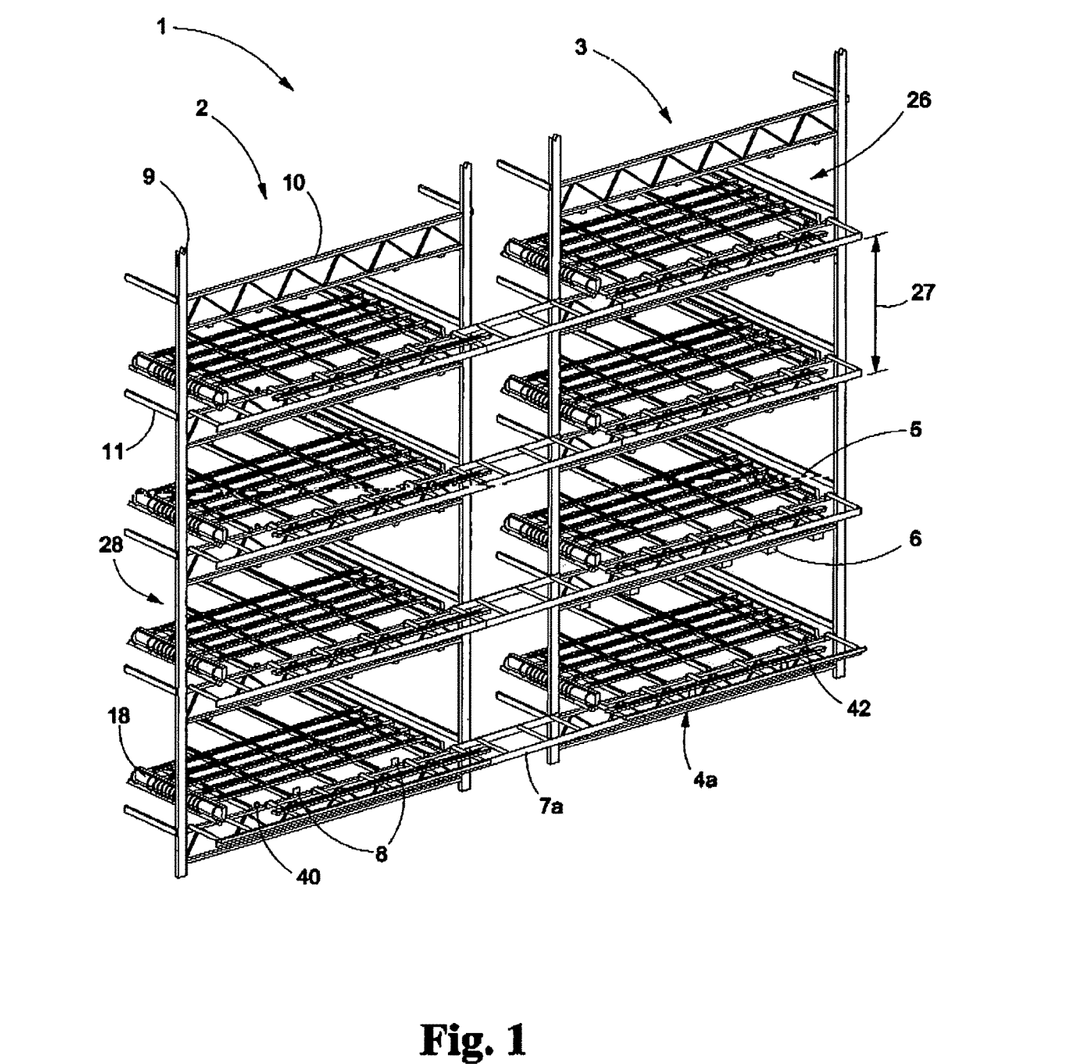
FIG. 1 is a front perspective view of the racking structure of an embodiment of the present invention.
Figure 2:
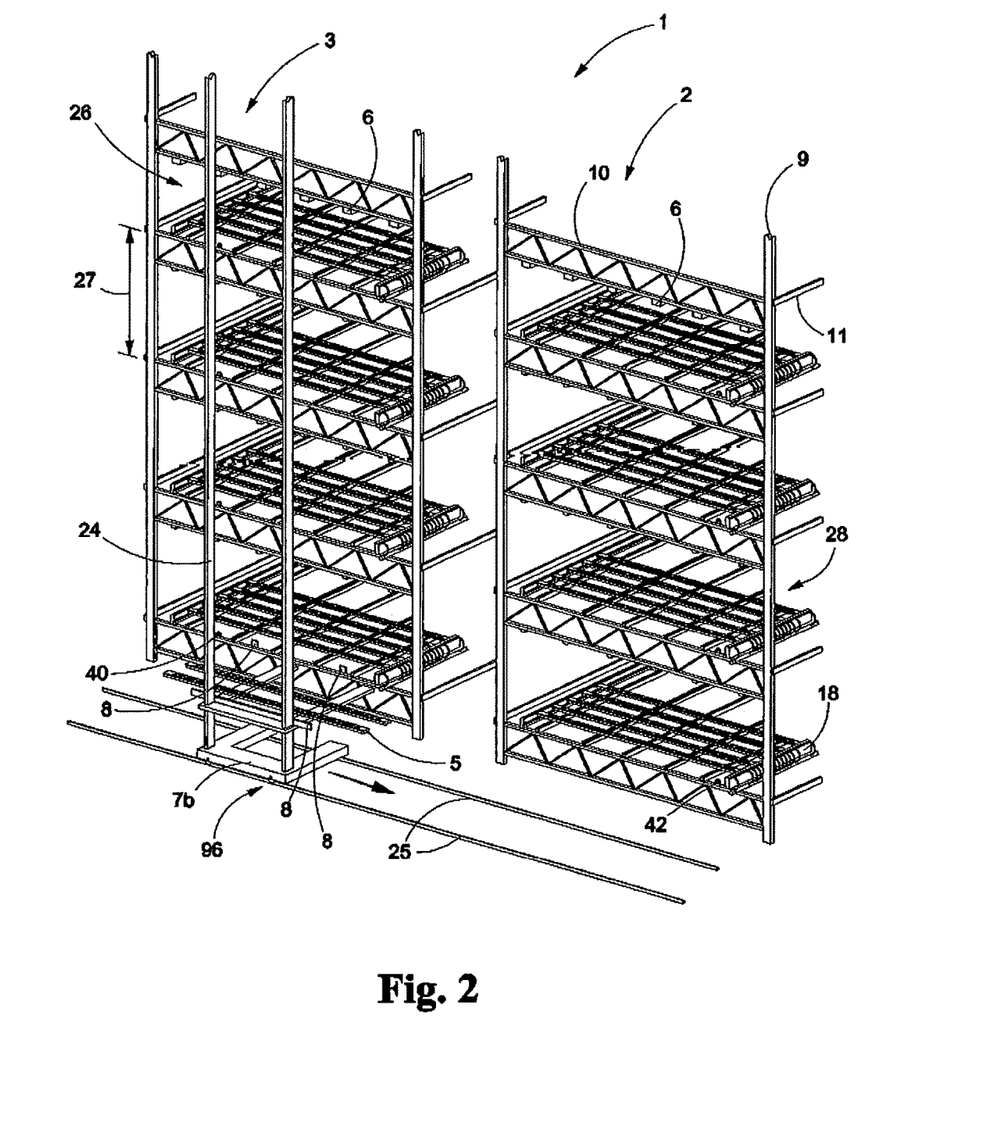
FIG. 2 is a back perspective view of the racking structure of FIG. 1, illustrating a lift.
Figure 3:
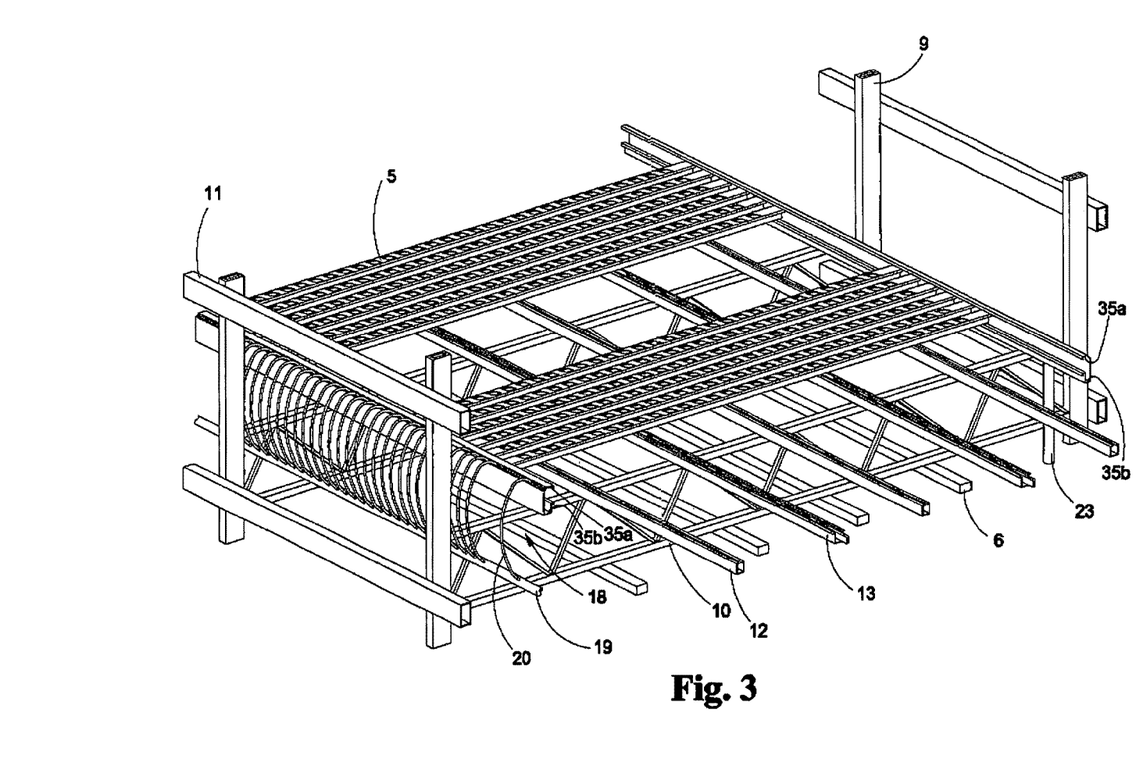
FIG. 3 is a detail perspective view of a level of one of the towers of the racking structure of FIG. 1.
Figure 4:
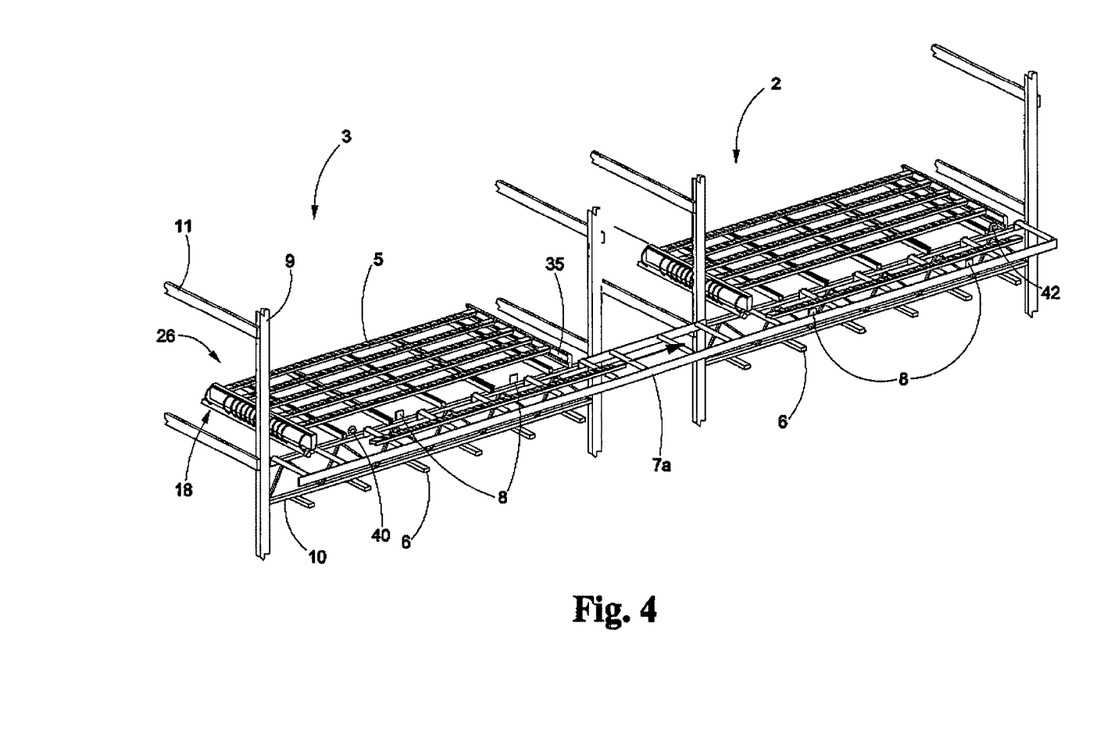
FIG. 4 is the front perspective view of a level of each tower of the racking structure of FIG. 1, illustrating the powered transfer conveyor belt.
Figures 5A, 5B:
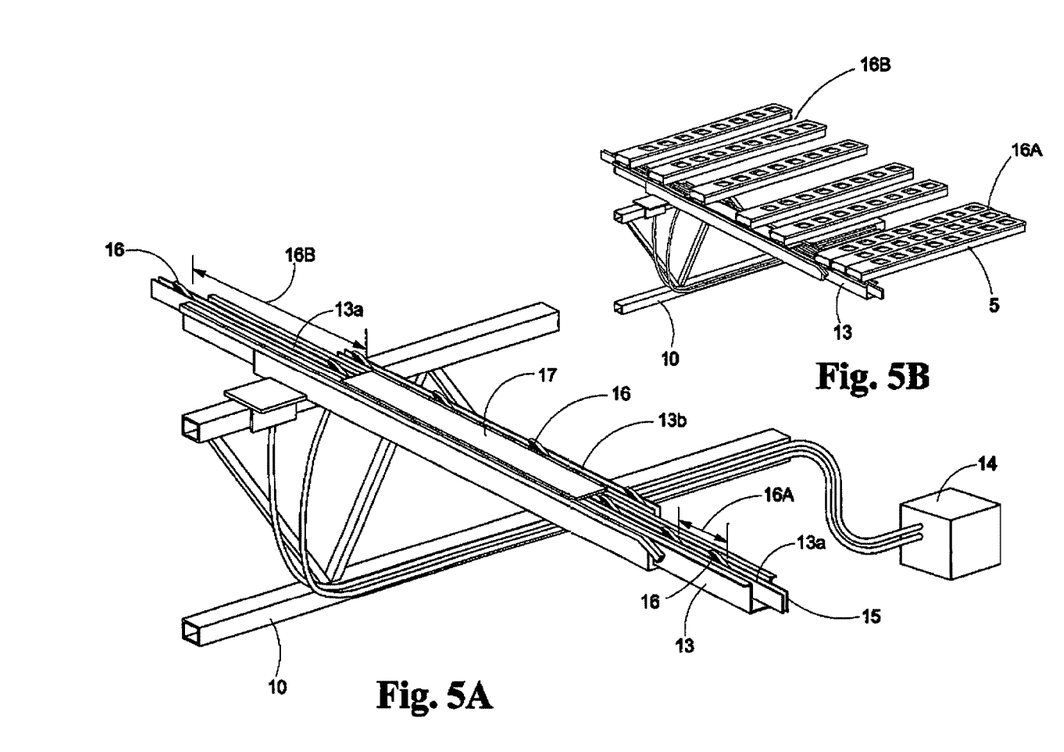
FIG. 5A is a detail perspective view of FIG. 4 illustrating a switch box used to change the gutter spacing on the rack structure levels.
FIG. 5B is a view of the switch box of FIG. 5A in use changing the gutter spacing on the rack structure levels.

In certain embodiments, the transport track 13 is used to change the spacing between each of the gutters 5. In such embodiments, the transport track 13 may include a delivery track 13*a* and a spacer track 13*b*. The delivery track 13*a* includes a first end and a second end and the spacer track 13*b* is disposed in between the first end and the second end of the delivery track 13*a*. A switch box 17 transfers the gutters 5 between the delivery track 13*a* and the spacer track 13*b*. The chain 15 of the delivery track 13*a* includes a plurality of the clackers 16 having a first distance apart 16*a* from one another. The chain 15 in the switch box 17 of the spacer track 13*b* includes a plurality of clackers 16 having a second distance 16*b* apart from one another. In certain embodiments, the first distance 16*a* is smaller than the second distance 16*b*.

Figure 6A:
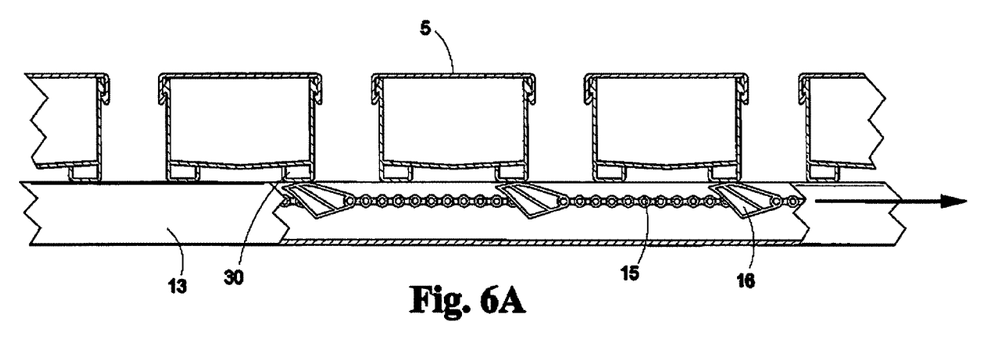
FIG. 6A is a side cutaway view of the switch box and the gutters of FIG. 5B illustrating spring clasps in a pivoted state.
Figure 6B:
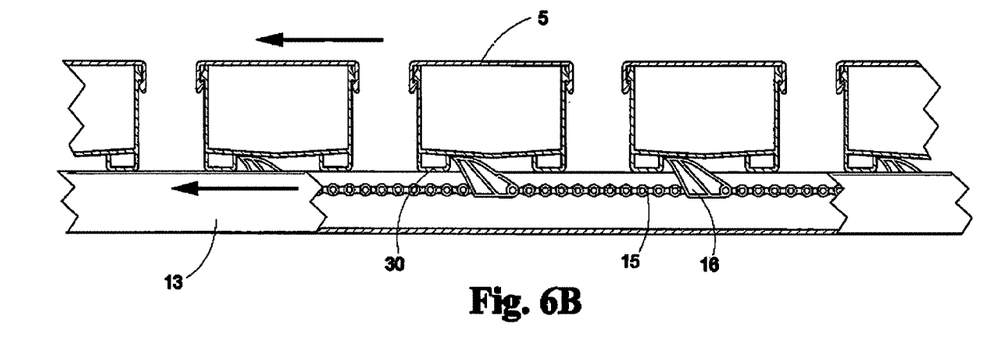
FIG. 6B is a side cutaway view of the switch box and the gutters of FIG. 5B illustrating the spring clasps engaging feet of the gutters.

In certain embodiments, the delivery track 13*a* includes the plurality of the clackers 16 pivotally secured to the chain 15 and spring biased to protrude beyond the upper channel. Each of the plurality of clackers 16 of the delivery track 13*a* may include a tapered portion and a vertical portion. The actuator 14 pushes and pulls the chain 15 of the delivery track 13*a*. When the actuator 14 pulls the chain 15 backwards, the tapered portion hits the outside of the foot 30 of the gutter 5 and pivots against the spring bias. When the actuator 14 pulls the chain 15 forward, the vertical portion catches the inside of the foot 30 and pushes the gutter 5 ahead. In certain embodiments, the chain 15 of the spacer track 13*b* has a separate actuator 14 and includes a plurality of the clackers 16. The actuator 14 pulls the chain 15 forwards and backwards.

In use, the planter places the gutters 5 on the first end of the delivery track 13*a*. The actuator 14 may pull the chain 15 forward, thereby pushing the gutter 5 towards the spacer track 13*b*. Once the gutter 5 has reached the spacer track 13*b*, the clackers 16 of the spacer track 13*b* push the gutters 5 to the second side of the delivery track 13*a* in which a clacker 16 of the second side of the delivery track 13*a* pushes the gutter to the second end of the level 26. The actuator 14 then pulls the chain 15 of the first end of the delivery track 13 backwards. The clackers 16 hit the feet of the gutter 5 and pivot downwards. The clackers 16 move underneath of one gutter 5 to the next gutter 5. The actuator 14 then pulls the chain 15 of the first end of the delivery track 13*a* forward and the clackers 16 then pushes other gutters 5 onto the spacer track 13*b*. The spacing of the gutters 5 are adjusted to different spacing, as required by the LAI of the plant, between the clackers 16 of the delivery track 13*a* and the spacer track 13*b*.

The first level conveyor 12, 13 and the second level conveyor 12, 13 may further include at least a first support track 12 and a second support track 12. The first and second support tracks 12 may run from the front end to the rear end.

In certain embodiments, the transport track 13 is disposed in between the first support track 12 and the second support track 12. The support tracks 12 are used to support and guide the gutters 5 from the front end to the rear end of the first and second levels 26.

In certain embodiments, the present invention may utilize a computer system. In such embodiments, sensors 40 are located at each end of all levels of the towers 1 to monitor the movement of the gutters 5 and to inform a central control panel when the push arms 8 are required to operate and to prevent any gutters 5 for falling out of the towers 1. The computer software system monitors and tracks every gutter 5 as to the date it was planted, when it will be ready to harvest, on which level 26 it is and in which tower 1. This is accomplished by manually entering the information into the computer or by utilizing the bar code reader 42 and bar code 41 located on the side of every gutter 5. The computer system may also control all the commands to move the gutters 5 throughout the towers 1 on a continuous closed loop growing cycle.

It should be understood, of course, that the foregoing relates to exemplary embodiments of the invention and that modifications may be made without departing from the spirit and scope of the invention as set forth in the following claims.

What is claimed is:

1. A multilevel system for growing vegetation comprising:
    a first level comprising a front end, a rear end opposite the front end, a first side, and a second side opposite the first side, and a first level conveyor moving in a first direction from the front end to the rear end;
    a second level comprising a front end, a rear end opposite the front end, a first side, and a second side opposite the first side, and a second level conveyor moving in a second direction from the front end to the rear end, wherein the first direction is opposite the second direction, wherein the first level conveyor and the second level conveyor each comprise:
        a delivery track and a spacer track each comprising an upper channel running from the front end to the rear end, wherein the delivery track comprises a first end and a second end and the spacer track is disposed in between the first end and the second end of the delivery track;
        a first chain running within the delivery track and a second chain running within the spacer track;
        an actuator operable to drive the first chain and the second chain; and
        clackers attached to the first chain and the second chain and protruding beyond the upper channels;
    a transfer conveyor;
    a plurality of lights disposed over and positioned to emit light on the first level conveyor and the second level conveyor; and
    at least one gutter operable to support a plant within, wherein the gutter comprises a foot protruding from a bottom end, wherein
    the actuator of the first level conveyor drives the first chain and the second chain and the clackers catch the foot of the gutter, thereby pushing the gutter from the front end to the rear end of the first level,
    the transfer conveyor transfers the at least one gutter from the rear end of the first level to the front end of the second level, and
    the actuator of the second level conveyor drives the first chain and the second chain and the clackers catch the foot of the gutter, thereby pushing the gutter from the front end to the rear end of the second level.

2. The multilevel system of claim 1, wherein the first level and the second level are disposed side by side one another and the transfer conveyor comprises a conveyor belt.

3. The multilevel system of claim 1, wherein the first level and the second level are disposed above and below one another and the transfer conveyor comprises a lift.

4. The multilevel system of claim 1, further comprising a plurality of towers comprising at least a first tower and a second tower disposed side by side, wherein each of the first tower and second tower comprises a plurality of the first levels and second levels disposed above and below one another.

5. The multilevel system of claim 4, wherein the transfer conveyor comprises:
    a lift disposed at a rear end of the plurality of towers and comprising a vertical track and a horizontal track, wherein the lift transfers the at least one gutter from one of the first levels to one of the second levels; and
    a plurality of conveyor belts disposed at a front end of the plurality of towers, wherein each of the conveyor belts transfers the at least one gutter from one of the second levels to one of the first levels.

6. The multilevel system of claim 1, wherein the at least one gutter comprises a plurality of gutters.

7. The multilevel system of claim 1, wherein the at least one gutter comprises:
    an elongated base comprising a bottom and sidewalls extending from the bottom; and
    an elongated cover attached to the sidewalls forming an enclosure in between the elongated base and the elongated cover, wherein the elongated cover comprises a plurality of plant plug holes sized to receive and retain a plant within.

8. The multilevel system of claim 7, wherein each of the first level and the second level comprises a watering system operable to deliver water to the at least one gutter.

9. The multilevel system of claim 8, wherein the elongated base comprises a first side comprising a catch pan and a second side comprising an open end.

10. The multilevel system of claim 9, wherein the watering system comprises:
    a plurality of hoses connected to a water line, wherein the plurality of hoses are disposed on the first side of the levels and are positioned to deliver water to the catch pan; and
    a return pipe disposed on the second side of the levels and positioned to receive water from the open end and transport the water to a water reservoir.

11. The multilevel system of claim 10, wherein the watering system further comprises a support bracket secured to the first side of the levels, wherein the support bracket comprises a plurality of hose openings, where the each of the plurality of hoses runs from the water line to one of the hose openings.

12. The multilevel system of claim 1, wherein the first chain of the delivery track comprises the clackers comprising a first distance apart from one another, wherein the second chain of the spacer track comprises the clackers comprising a second distance apart from one another, wherein the first distance is smaller than the second distance.

13. The multilevel system of claim 12, wherein the clackers are pivotally secured to the first chain and spring biased to protrude beyond the upper channel.

14. The multilevel system of claim 13, wherein the clackers of the first chain comprise a tapered portion and a vertical portion, wherein the actuator pulls the first chain of the delivery track forward and backward, wherein when the actuator pulls the first chain backward, the tapered portion hits the foot of the gutter and pivots against the spring bias, wherein when the actuator pulls the first chain forward, the vertical portion catches the foot and pushes the gutter.

15. The multilevel system of claim 1, further comprising a switch box operable to move the gutter from the delivery track to the spacer track.

16. The multilevel system of claim 1, wherein the first level conveyor and the second level conveyor convey along a horizontal plane.

* * * * *